United States Patent [19]

White et al.

[11] 4,340,696

[45] Jul. 20, 1982

[54] FORMAL-COUPLED POLYPHENYLENE OXIDES

[75] Inventors: Dwain M. White, Schenectady; George R. Loucks, Scotia, both of N.Y.

[73] Assignee: General Electric Company, Schenectady, N.Y.

[21] Appl. No.: 222,409

[22] Filed: Jan. 5, 1981

[51] Int. Cl.$^3$ .................... C08G 65/48; C08L 71/04
[52] U.S. Cl. ........................... 525/390; 525/534; 525/905; 528/212; 528/219
[58] Field of Search .............. 528/212, 219; 525/534, 525/390, 905

[56] References Cited

U.S. PATENT DOCUMENTS

| | | | |
|---|---|---|---|
| 3,069,386 | 12/1962 | Barclay | 528/196 |
| 3,306,875 | 2/1967 | Hay | 528/212 |
| 3,914,266 | 10/1975 | Hay | 528/212 |
| 4,028,341 | 6/1977 | Hay | 528/212 |
| 4,136,887 | 1/1979 | Williams et al. | 528/219 |
| 4,140,675 | 2/1979 | White | 528/125 |
| 4,163,833 | 8/1979 | Johnson | 528/219 |
| 4,210,731 | 7/1980 | Relles et al. | 525/469 |
| 4,234,706 | 11/1980 | White | 528/126 |
| 4,254,252 | 3/1981 | Hay | 528/219 |
| 4,260,733 | 4/1981 | Loucks et al. | 528/219 |

*Primary Examiner*—Allan Lieberman
*Attorney, Agent, or Firm*—Peter A. Bielinski; James C. Davis, Jr.; Marvin Snyder

[57] ABSTRACT

This invention relates to formal-coupled polyphenylene oxides. These new polymers can be molded, calendered, or extruded as films, sheets, fibers, laminates or other useful articles of manufacture.

4 Claims, No Drawings

FORMAL-COUPLED POLYPHENYLENE OXIDES

BACKGROUND OF THE INVENTION

1. Field of the Invention

This invention relates to formal-coupled polyphenylene oxides. These new polymers can be molded, calendered, or extruded as films, sheets, fibers, laminates or other useful articles of manufacture.

2. Description of the Prior Art

Polyphenylene oxides having an average hydroxyl group per molecule of 1.0 or less, are described in A. S. Hay's U.S. Pat. Nos. 3,306,875; 3,914,266; 4,028,341 and polyphenylene oxides having an average hydroxyl group per molecule greater than zero including 2.0 or less are described in D. M. White's U.S. Pat. Nos. 4,140,675 and 4,234,706 among others.

Polyformals are described in R. Barclay, Jr's U.S. Pat. No. 3,069,386 and A. S. Hay's copending U.S. Ser. No. 958,040 filed Nov. 6, 1978.

DESCRIPTION OF THE INVENTION

This invention embodies formal-coupled polyphenylene oxides. These polymers are formed by the reaction of methylene halides and polyphenylene oxides.

In general, illustrative of the broad group of formal-coupled polyphenylene oxides included within the scope of this invention are those described among others by the following model structures:

(I linear) AZA, AZB, BZB, AZBZA, AZBZB, BZBZB, etc.

The above illustrative linear combinations of polyphenylene oxides and methylene halides including random and/or alternating arrangements of polymer units defined by the units, A, B, or Z—which units are described in greater detail hereafter—are not intended to limit the combinations that can be obtained by the practice of this invention since the polymer combinations of this invention are limited only by the amount and/or type of polymer precursor charged to the reaction medium when carrying out the process of this invention.

The expression polyphenylene oxides includes "monofunctional polyphenylene oxides" well known to those skilled in the art having an average hydroxyl group per molecule value greater than zero including 1.0 or less. These polyphenylene oxides can be prepared by any of the methods of the prior art, and may be illustrated by formula (I) set out hereafter:

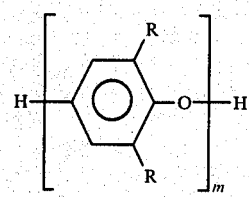

wherein independently each R is hydrogen, a hydrocarbon radical, a halohydrocarbon radical, a hydrocarbonoxy radical or a halohydrocarbonoxy radical, m is a number of at least 1, preferably 10, and more preferably 40 to 170. The monofunctional polyphenylene oxide units of the block polymers can be conceptualized by the structure of formula (I) above wherein the hydrogen atom is disassociated from the monohydroxy group of the polyphenylene oxide, i.e., a phenoxy radical, which may be referred to as a monovalent phenoxy radical, abbreviated herein by the formula —A.

The expression "polyphenylene oxide" also includes "polyfunctional polyphenylene oxides" also well known to those skilled in the art including quinone-coupled polyphenylene oxides having an average hydroxyl group per molecule greater than zero including 2.0 or less. These polyphenylene oxides can be prepared by the methods described in U.S. Pat. No. 4,234,706 and can be illustrated by formula (II) set out hereafter:

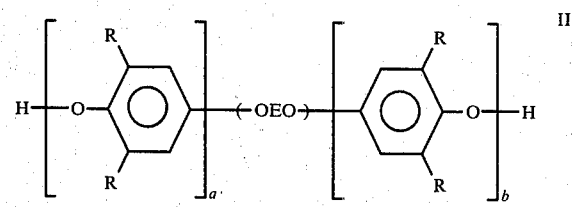

wherein independently —(OEO)— is a divalent quinone residue, E is a divalent arene radical, either a or b is at least equal to 1, the sum of a plus b is preferably at least equal to 10, more preferably 40 to 170, R is the same as in formula (I) above. The polyfunctional polyphenylene oxide units of the block polymers can be conceptualized by the structure of formula (II) above wherein the hydrogen atoms are disassociated from the hydroxy groups of the quinone-coupled polyphenylene oxide, i.e., a quinone-coupled polyphenoxy radical, which may be referred to as a divalent phenoxy radical, abbreviated herein by the formula —B—.

The expression "methylene halides" as employed herein and in the claims includes dichloromethane—more commonly known as methylene chloride-dibromomethane, bromochloromethane including mixtures thereof. The coupling agent of the polymers can be conceptualized by the —CH₂— divalent methylene radical wherein the halogen atoms are disassociated from the methylene halides. These radicals are abbreviated herein by the symbol —Z—.

In general, the process of preparing formal-coupled polyphenylene oxides comprises contacting mono and/or polyfunctional polyphenylene oxides and methylene halides in the presence of an aqueous solution of a water soluble base and, optionally, a catalytic phase transfer agent. Any amount of functional (reactive) polyphenylene oxide and methylene halide can be employed, subject to the proviso that the methylene halide is present in excess e.g. from 2 to 5 times the stoichiometric requirements required to completely couple all of the reactive polyphenylene oxide.

The process can be carried out by introducing a methylene halide to a solution of a polyphenylene oxide and an inert solvent under fluid mixing conditions wherein the liquid reaction medium experiences high fluid shear stress since the initial reaction kinetics are highly sensitive to the dispersion of the reactants. Preferably the reaction is carried out within a reaction environment containing a mixing impeller, e.g. an axial-flow or radial flow impeller, such as a marine-type mixing propeller, fan turbine, pitched paddle, curved blade turbine, spiral backswept turbine, flat-blade turbine, gas impeller, anchor impeller, etc., in order to establish and maintain high fluid shear rates and accordingly high fluid shear stresses. The addition of large excesses of methylene halide under the aforesaid process conditions facilitates the rapid formation of formal-coupled polyphenylene oxide. In general, process equipment employing high-speed axial-flow impeller mixers are presently preferred in our process.

Optionally, the process can be carried out in the absence of any inert solvent. e.g. where the methylene halide acts as both reactant and solvent. Wherein an inert solvent is employed preferably the solvent is a non-polar or low- to medium-polar solvent subject to the proviso, more preferably, that the solvent employed be substantially free of protic solvents, especially protic solvents capable of strong hydrogen bonding. In general, among presently preferred solvents are the following:

(A) non- or low-polar solvents such as p-cymene, cumene, decalin, toluene, xylene, benzene, diphenyl ether, dioxane, thiophene, tetrahydrofuran, etc., and mixtures thereof, and (B) medium-polarity solvents such as chlorobenzene, anisole, bromobenzene, dichlorobenzene, iodobenzene, acetophenone, etc., and mixtures thereof.

In a preferred embodiment, the process is carried out in the substantial absence of any hydrolyzing agent, e.g. methanol, etc., or any other chemical constituents which can promote undesirable side reactions, e.g. primary or secondary amines. Accordingly, it is highly desirable that individually, and preferably collectively, any potential hydrolyzing agent content be limited to less than 1%, and more preferably less than ½% based on the weight of polyphenylene oxide and methylene halide reactants.

Any water soluble base can be employed, however, preferably is an aqueous solution of a water soluble base, e.g. an aqueous alkaline metal or alkaline earth metal hydroxide or carbonate solution. Specific examples include aqueous solutions of potassium hydroxide, sodium hydroxide, sodium monocarbonate, barium carbonate, etc. Any amount of water soluble base can be employed. Generally effective mole proportions of water soluble base relative to the hydroxyl groups associated with the polymer are from about 1:100 to about 50:1 and more frequently from about 1:10 to about 10:1.

Any catalytic phase transfer agent can be employed, however, preferably is a phase transfer agent selected from the group consisting of quaternary ammonium, quaternary phosphonium, and tertiary sulfonium compounds or mixtures thereof. These phase transfer agents are well known and include illustratively "onium compounds" described by C. M. Starks in J.A.C.S. 93, 195 (1971), "crown ethers" described in Aldrichimica ACTA 9, Issue #1 (1976) Crown Ether Chemistry-Principles and Applications, G. W. Gokel and H. D. Durst, as well as C. J. Pederson in U.S. Pat. No. 3,622,577 and "chelated cationic salts" which include alkali or alkaline earth metal diamine halides. Specific illustrative examples are described in U.S. Pat. No. 4,201,721 whose descriptions are incorporated herein in their entity by reference.

Any amount of catalytic phase transfer agent (PTA) can be employed, however generally effective molar proportions of phase transfer agent relative to the amount of water soluble base are within the range of from about 1:10 to about 1:1000 and more frequently within the range of from about 1:100 to 1:500.

The coupling reactions can be carried out at any temperature. Preferably temperatures within the range of from 0° to 150° C. or even higher, and more preferably from 50° C. to 100° C. are employed.

In order that those skilled in the art may better understand the invention, the following examples are given which illustrate the best mode of practicing the invention.

EXAMPLE I

Preparation of Poly-Functional Polyphenylene Oxide 2,6 xylenol was polymerized in accordance with the following procedure:

A 2.5 gallon stainless steel reactor equipped with an air-driven paddle stirrer, oxygen inlet tube, and water-cooled coil and jacket was charged with 2.3 l toluene, 150 g 2,6-xylenol, 4.2 ml. of a stock catalyst solution, i.e. (19.31 g cuprous oxide added slowly with stirring to 100 ml. of a 47.2% aqueous hydrogen bromide (HBr) solution, 3.4 g. N,N'-di(t-butyl)ethylene diamine (DBEDA), 47.5 g. N,N-dimethylbutylamine (DMBA), 15 g. di(n-butyl)amine (DBA) and 1.5 g. tricaprylmonomethylammonium chloride (Adogen 464). Oxygen was bubbled into the resulting admixture at a rate of 8.3 moles per hour while vigorously agitating the admixture, and 1350 g. of 2,6 xylenol dissolved in 1.5 l of toluene was pumped into the reactor over a 30 minute period. The temperature rose from 25° to 35° C. and was held at 35° C. After 85 minutes an additional 1.7 g. of DBEDA was added. The polymerization reaction was terminated by replacing the oxygen stream with nitrogen and adding 15 ml. of a 38% aqueous solution of trisodium ethylene-diamine tetraacetate ($Na_3EDTA$). The resulting reaction mixture was heated at 50°-55° C. under nitrogen for about one and one-half hours and the polymer was precipitated by adding three volumes of methanol. The precipitated polymer was filtered and washed with methanol yielding a white solid reaction product having an intrinsic viscosity of 0.31 dl./g. measured in chloroform at 25° C. An infrared spectrum of the polymer showed a peak with an absorbance at 3610 $cm^{-1}$ of 0.301. Molecular weight determination by GPC analysis based on a polystyrene calibration furnished the following data:

$\overline{M}w = 28,622$
$\overline{M}n = 8,351$
$\overline{M}z = 50,961$
$\overline{M}w/\overline{M}n = 3.43$
$\overline{M}z/\overline{M}w = 1.78$

EXAMPLE II

Preparation of Formal-Coupled Polyphenylene Oxide

A 300 ml blender equipped with a nitrogen inlet, thermocouple and addition port was charged with 30 ml monochlorobenzene and 10.0 g of the polyfunctional polyphenylene oxide prepared as in Example I. Water at ~70° C. was circulated through the blender jacket. 0.05 g Adogen 464 and 1.3 ml 50% aqueous sodium hydroxide were charged to the blender. After high speed mixing for 3 minutes, 2.5 g methylene bromide (neat) was added all at once and high shear mixing conditions were maintained for 40 minutes. A sharp increase in viscosity occurred at about 30 minutes evidenced by an increase in temperature to about 80° C.

The resulting viscous polymer solution was diluted with 5 volumes of toluene, transferred to a larger blender and acidified with conc. hydrochloric acid. The formal-coupled polymer was coagulated by addition of 4 volumes of methanol, collected, washed with fresh methanol and dried overnight in vacuo at 60° C. The resulting formal-coupled polyphenylene oxide had an intrinsic viscosity of 0.62 dl/g measured in chloroform at 25° C.; and an IR absorbance at 3610 cm$^{-1}$ of 0.071.

A summary of the reaction parameters including the relative amounts of methylene halide coupling agent polyphenylene oxide reaction temperature, time of addition of methylene halide, total contact time, change in intrinsic viscosity as well in the relative amount of hydroxyl end group associated with the polyphenylene oxide feedstock and the formal coupled polyphenylene oxide is set out in Table I hereafter.

TABLE I

| Example | Temp. (C.°) | Methylene Bromide Coupling Agent | | | Total Contact Time | Δ IV From/To | Δ OH From/To |
|---|---|---|---|---|---|---|---|
| | | Wt./10g PPO | Added as | Add'n Time | | | |
| 2 | 70–80° | 2.5g | Neat | All-at-once | 40 min. | .31/.62 | .301/.071 |

EXAMPLE III

Preparation of Formal-Coupled Polyphenylene Oxide

Methylene chloride coupling of polyphenylene oxide under reaction conditions identical to those described in Example II was carried out with the exception that 4.0 g of methylene chloride was employed rather than 2.5 g of methylene bromide. A summary of the reaction parameters the resulting reaction product is set out in Table II hereafter.

TABLE II

| Example | Temp. (C.°) | Methylene Chloride Coupling Agent | | | Total Contact Time | Δ IV From/To | Δ OH From/To |
|---|---|---|---|---|---|---|---|
| | | Wt./10g PPO | Added as | Add'n Time | | | |
| 3 | 75–80° | 4.0 g | Neat | All-at-once | 31 min. | .31/.49 | .301/.134 |

Although the above examples are directed to only a few of the very many variables which can be employed in the practice of the present invention, it should be understood that the present invention is directed to a much broader class of formal-coupled polyphenylene oxides consisting essentially of coupled units of polyphenylene oxides of formulas (I) and/or (II) and methylene halides of formula —CH$_2$—. The formal-coupled polyphenylene oxide polymers can be molded, calendered, or extruded as films, sheets, fiber, laminates, or other useful articles of manufacture.

We claim:

1. A formal-coupled polyphenylene oxide comprising a polyphenylene oxide radical of the formulas:

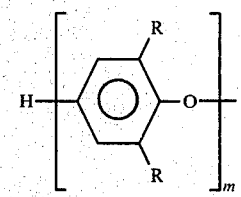

where independently each R is hydrogen, a hydrocarbon radical, a halohydrocarbon radical, a hydrocarbonoxy radical or a halohydrocarbonoxy radical, m is a number of at least 1, or

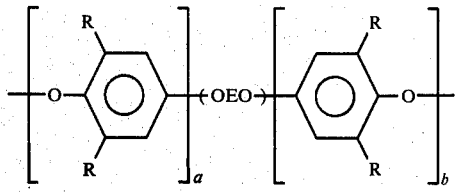

where independently each -(-OEO-)- is a divalent quinone residue, E is a divalent arene radical, either a or b is at least equal to 10, R is the same as above, and a methylene radical of the formula:

—CH$_2$—.

2. The claim 1 polymer where independently each R is hydrogen, a hydrocarbon or a halohydrocarbon radical.

3. The claim 2 polymer where m is 40 to 170, the sum of a plus b is 40 to 170.

4. A process of forming a formal-coupled polyphenylene oxide comprising contacting a polyphenylene oxide and a stiochiometric excess of a methylene halide coupling agent in the presence of an aqueous solution of a water soluable base.

* * * * *